United States Patent [19]

Day

[11] Patent Number: 4,846,689
[45] Date of Patent: Jul. 11, 1989

[54] MAGNETIC EDUCATIONAL AID AND TEACHING METHOD

[76] Inventor: Constance J. Day, 2702 S. Yucca Cir., Mesa, Ariz. 85202

[21] Appl. No.: 157,956

[22] Filed: Feb. 19, 1988

[51] Int. Cl.⁴ ............................................. G09B 1/08
[52] U.S. Cl. .................................. 434/168; 434/170; 434/190; 434/211; 434/304
[58] Field of Search ............... 434/190, 168, 304, 396, 434/167, 211

[56] References Cited

U.S. PATENT DOCUMENTS

| | | | |
|---|---|---|---|
| 364,845 | 6/1887 | Oakley | 434/167 |
| 2,202,077 | 5/1935 | Darling | 273/157 |
| 2,254,498 | 9/1941 | Scharf | 40/142 |
| 2,363,914 | 11/1944 | Wakefield | 46/157 |
| 2,465,971 | 3/1949 | Leblang | 46/45 |
| 2,586,017 | 2/1952 | Freedman | 434/304 |
| 2,987,831 | 6/1961 | Stepat | 35/56 |
| 3,276,151 | 10/1966 | Smith | 434/190 |
| 3,296,737 | 1/1967 | Doyle | 46/157 |
| 3,592,469 | 7/1971 | Glass | 273/1 |
| 3,724,101 | 4/1973 | Slezak | 434/168 X |
| 3,849,912 | 11/1974 | Kemnitzer | 434/98 |
| 4,030,736 | 6/1977 | Petrusek | 273/95 |
| 4,702,700 | 10/1987 | Taylor | 434/168 |

Primary Examiner—William H. Grieb
Attorney, Agent, or Firm—Don J. Flickinger; Jordan M. Meschkow; Lowell W. Gresham

[57] ABSTRACT

An educational aid, comprising a figure representing an animate object. A plurality of first enhancing means are provided which are adapted to attach magnetically to the figure. One surface of the first enhancing means bears representation of at least one teach object. A plurality of second enhancing means is provided, which are adapted to magnetically attach to the figure, wherein the second enhancing means relates to a feature of the teaching object.

9 Claims, 2 Drawing Sheets

MAGNETIC EDUCATIONAL AID AND TEACHING METHOD

BACKGROUND OF THE INVENTION

1. Field Of The Invention

The present invention relates to a magnetic educational aid and teaching method which uses a figure and various magnetically attachable enhancement means to teach children basic concepts of color, time, identification, shapes, counting and the like.

2. The Prior Art

Numerous devices and methods exist which teach young children concepts such as color, time, identification, shapes, counting an the like. However, in teaching such basic concepts, it is important that the device or method not be complicated, nor have pieces which can easily become lost. Preferably, such devices and/or methods should use items which are familiar to children, and with which children can easily identify. It is also helpful if the children have a sense they are "playing" while learning basic concepts.

Devices and methods which use magnetic attachments have become popular because such attachments help decrease inadvertent loss of the component parts.

U.S. Pat. No. 2,363,914 to Wakefield discloses a paper doll set wherein the doll contains a small magnet so that clothing pieces carrying metallic members can be placed on the doll, and the clothing will not become easily dislodged. However, the doll was not used to teach basic concepts; rather, the invention was solely for children's playtime U.S. Pat. No. 2,997,831 to Stepat et al. discloses a magnetic teaching aid for demonstrating clothing designs. In Stepat a demonstration board was used to teach the relationship and visual effect of elementary linear representations such as lines and arrows, on the visual effect of different costumes. However, this invention was directed toward adult clothing designers, and did not teach basic concepts to children.

SUMMARY OF THE INVENTION

The present invention is summarized as an educational aid for teaching basic concepts to children. The aid includes a figure which represents an animate object. A plurality of first enhancing means are adapted to magnetically attach to the figure. One surface of the first enhancing means bears a representation of at least one teaching object. A plurality of second enhancing means adapted to magnetically attach to the figure are provided, wherein the second enhancing means relates to a feature of the teaching object.

It is an object of the present invention to provide an educational aid to teach children basic concepts of color, time, identification, shapes, counting and the like by using figures familiar to children together with magnetically attachable enhancements selected to teach the concepts, which enhancements are not easily dislodgeable from the figure.

It is a further object of the present invention to provide an educational method for teaching basic concepts of color, shapes, counting and the like, by selecting a figure and magnetically attachable enhancements which relate to the various concepts sought to be taught.

Other objects, advantages, and features of the present invention will become more apparent from the following detailed description when taken in conjunction with the accompanying drawings.

DETAILED DESCRIPTION OF THE PREFERRED EMBODIMENT

Although the drawings show only three different embodiments of the educational aid, it will be understood that an educational aid can be constructed in accordance with the invention, by using a variety of different figures and first and second enhancement means to teach different basic, early learning concepts.

Figure 1:
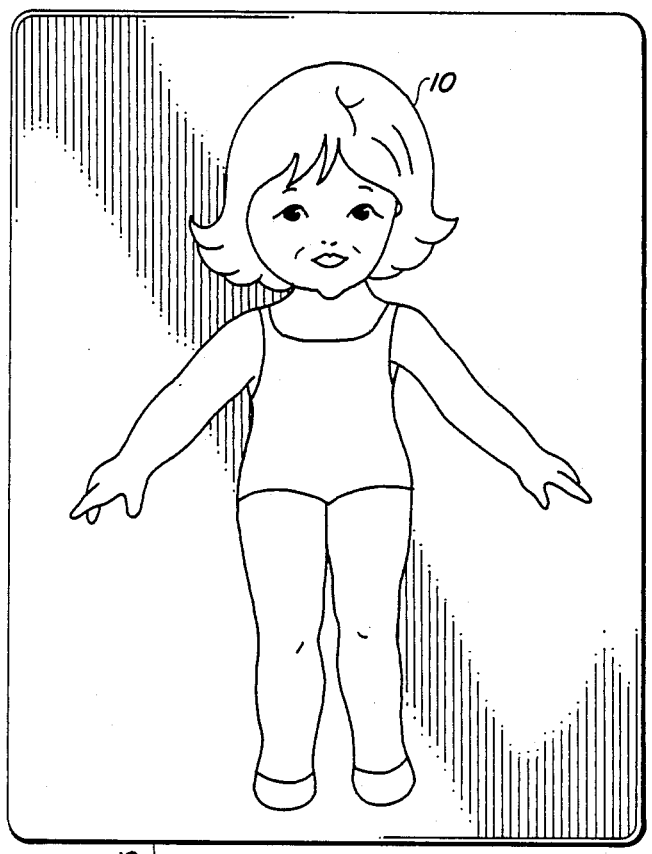
FIG. 1 is a plan view of one embodiment of the figure of the educational aid with first enhancing means removed and shown separately at the right side of FIG. 1.
Figure 2:
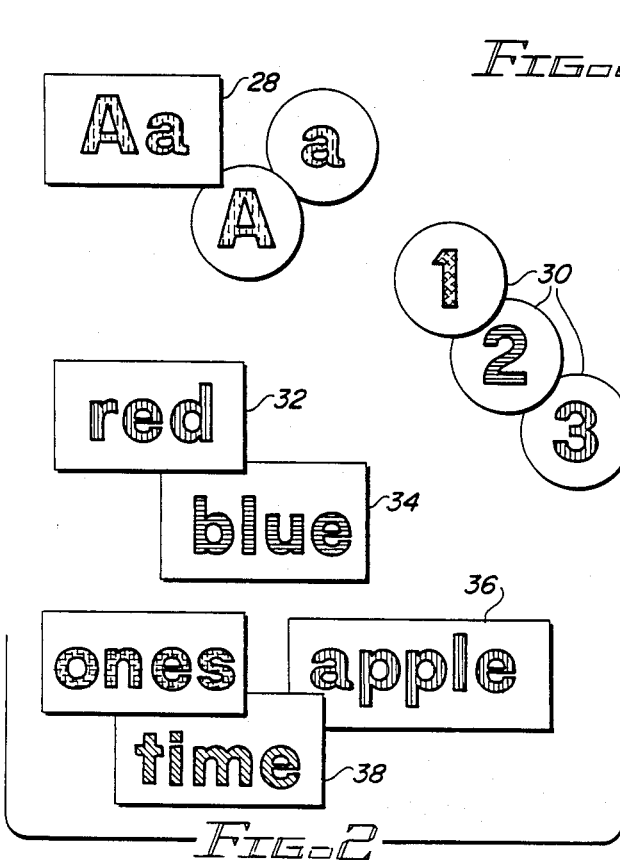
FIG. 2 is a plan view of examples of second enhancing means which relate to the first enhancing means shown in FIG. 1 and which can be magnetically attached to the figure shown in FIG. 1.
Figure 7:
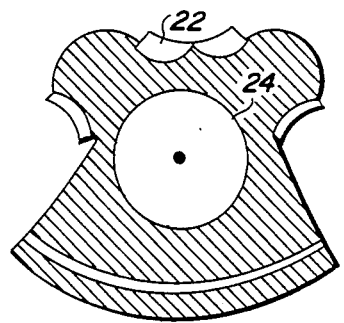
FIG. 7 is a plan view of first enhancing means and second enhancing means used in the second embodiment of the educational aid and attached to the figure in FIG. 5.

FIGS. 1, 2 and 7 illustrate one figure of the educational aid with various first enhancement means and second enhancement means, which when assembled constitute three embodiments of the educational aid. Referring particularly to FIG. 1, reference number 10 indicates a figure which can be used to construct an educational aid of the present invention. The figure can be part of plate 12, or exist on its own. Although FIG. 10 represents a small female, and figure can be used which would appeal to children. Other figures which could be used include male figures, various animals such as dogs, cats, horses and the like and representatives of various ethnic or national groups such as Mexicans, Blacks, Indians, Orientals, etc. Figures which relate to various occupations can also be used, for example a cowboy, doctor, cook, sports players, fireman, policeman and the like. The figure could also be three dimensional rather than two-dimensional.

Continuing with FIG. 1, three different embodiments of the first enhancing means are shown. Dress 14 includes on its top surface a representation of an apple 16, which is an edible object and constitutes one embodiment of a teaching object of the present invention. Dress 14 can be magnetically attached to FIG. 10 in one of several ways. Either FIG. 10 can be metallic (with or without optional plate 12), and dress 14, as an example of a first enhancing means, could be made of a paramagnetic material, or vice versa. Dress 14 and apple 16 are crosshatched to illustrate the color red.

A second embodiment of a first enhancing means is shown in dress 18, which is crosshatched to show the color blue, and which has on its topmost surface a plurality of teaching objects, namely, blue squares 20. A third embodiment of a first enhancing means is shown at dress 22, which is crosshatched to indicate the color green, and which has on its topmost surface a teaching object which is a blank clock face 24 having removable hour and minute hands 26.

Although only one figure together with three first enhancing means has been shown in these embodiments of the present invention, other first enhancing means could be chosen for FIG. 10, such as various shapes rather than clothing. Alternatively, if another figure is selected, first enhancing means appropriate for that figure could be selected, together with various teaching objects such as edible fruit, means to tell time, or geometric shapes. Examples of geometric shapes include a circle, square, triangle, oval diamond, rectangle, heart and the like. Edible objects, including fruits, vegetables, and other items which would be familiar to children, can be selected.

Figure 4:
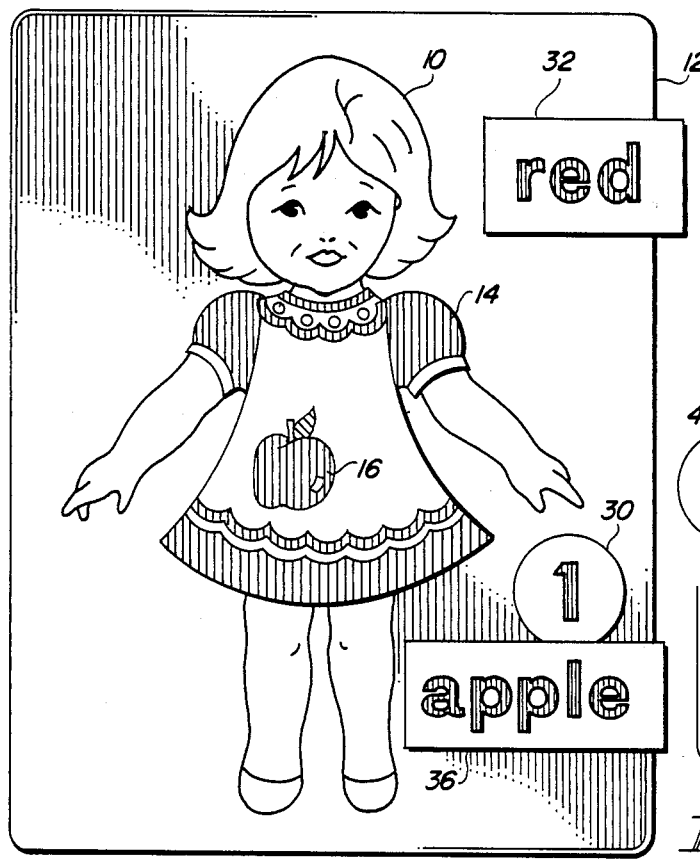
FIG. 4 is a plan view of one embodiment of an educational aid constructed in accordance with the present invention.
Figure 5:
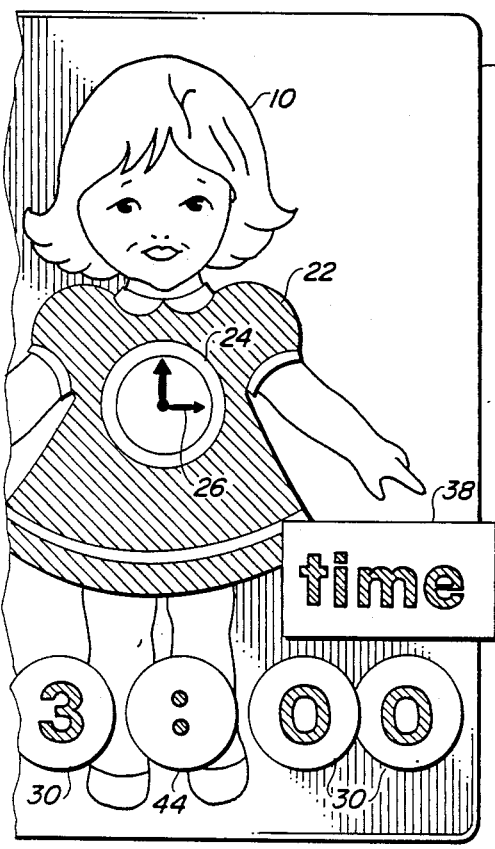
FIG. 5 is a plan view of a second embodiment of an educational aid constructed in accordance with the invention.
Figure 6:
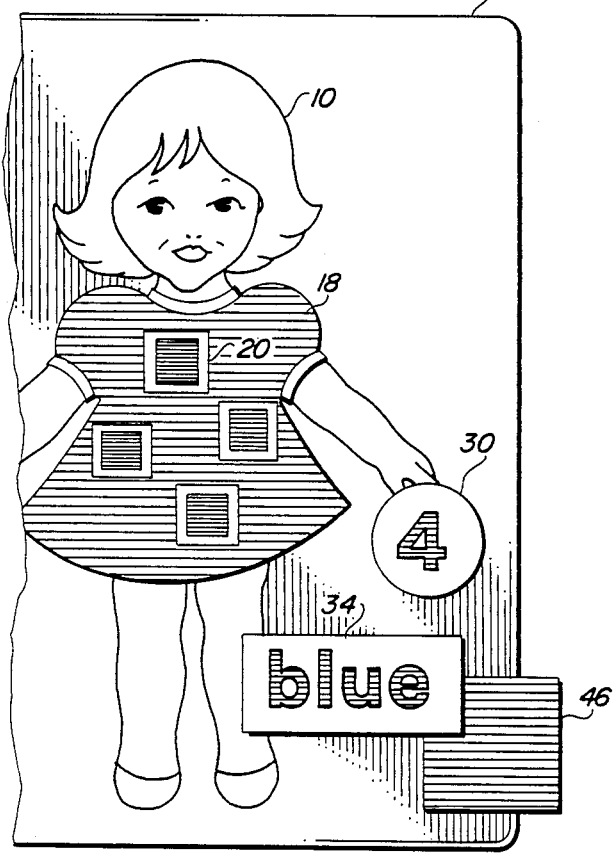
FIG. 6 is a plan view of a third embodiment of an educational aid constructed in accordance with the present invention.

FIG. 2 illustrates a variety of second enhancing means. The alphabet letter "a" 28, shown in both upper and lower case, can be matched in a relationship with the teaching object, for example as being the first letter of the apple 16 teaching object shown on dress 14 in FIG. 1. Numbers or numerals 30 can be used as second enhancing means to relate either the number of teaching objects on each first enhancing means, as shown in FIG. 6, or to relate the time shown, in hours and minutes, with respect to teaching object 24 with clock hands 26 on first enhancing means 22, as illustrated in FIG. 5. The word red 32 can be used to relate either to the color of a teaching object, or color of a first enhancing means, as is shown in FIG. 4 where red can relate either to apple 16 or dress 14. In a like manner, blue 34 has been related to dress 18 and square 20 in FIG. 6. Obviously, there are many words which represent a rainbow of colors which could be used in the present invention. Apple 36 represents a second enhancing means which can be used to relate the name of a teaching object, as shown in FIG. 4, where the word apple 36 is used to identify teaching object apple 16 located on dress 14. The word time 38 can be used as suggested in FIG. 5 to relate the fact that a clock face 24 with associated clock hands 26 is the teaching object located on the top surface of dress 22.

Figure 3:
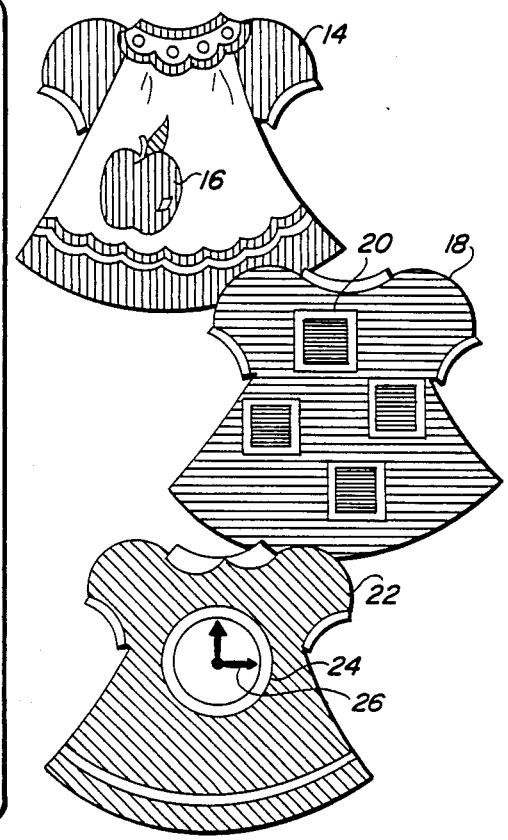
FIG. 3 is a plan view of various accessories which can also be attached to the figure shown in FIG. 1.

FIG. 3 illustrates various accessories which can also be placed on FIG. 10. Glasses 40 can be placed on the head of FIG. 10, and purse 42 can be placed in the hand of FIG. 10.

FIG. 4 illustrates the first embodiment of an educational aid which has been constructed in accordance with the present invention. First enhancing means (red dress 14) has been placed on FIGS. 10 by magnetic attachment. The first enhancing means has a teaching object (apple 16) located on the topmost surface. Various second enhancing means has been used to highlight different features of the first enhancing means thereby teaching 12 basic concepts of color, identification, and counting. For example, the word red 34 has been selected to indicate the color of the dress 14. The word apple 36 has been selected to indicate the teaching object located on the first enhancing means (dress 14). The number one 32 has been selected to represent the number of teaching objects (one apple 16) evident on the top surface of first enhancing means dress 14.

FIG. 5 illustrates another embodiment of the educational aid of the present invention, where the basic concept of time is illustrated by means of a first enhancing means 22 having thereon a teaching object blank clock face 24 together with associated and removable clock hands 26. Selection of appropriate second enhancing means reinforces the basic concept of telling time, by choice of the word time 38, and the appropriate numerals 300 to indicate that the time shown on the blank clock face 24 is 3:00. Colon 34 serves as a means to separate the numerals hours from the numerals indicating minutes. The second enhancing means used in this embodiment are shown separately in FIG. 7.

FIG. 6 is yet another embodiment of the present invention, wherein first enhancing means (dress 18) has been selected to illustrate the concepts of shapes, colors, and counting. Appropriate and related second enhancing means have bee chosen, in that number 4 indicates the number of teaching objects (squares 20) on dress 18, the word blue 34 indicates the color of the dress 18, and square 46 indicates the particular geometric shape which is the teaching object located on dress 18.

Figure 8:
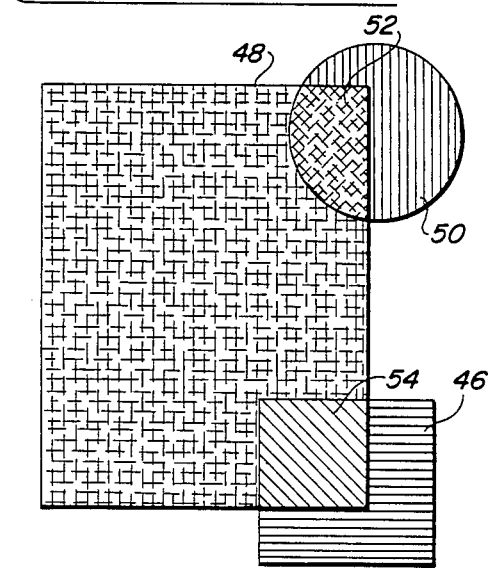
FIG. 8 is a plan view of a colored translucent overlay and shapes having primary colors which overlay creates secondary colors when placed over the primary colors.

FIG. 8 illustrates a translucent color overlay 48, which in this case is indicated to be yellow, which can create secondary colors from primary colors when the overlay is placed on primary colored materials. For example, in FIG. 8, yellow overlay 48 when placed over primary color red circle 50 creates secondary color orange section 52. In like manner, when yellow overlay 48 is placed over primary color blue 46, secondary color green 54 is created.

The educational teaching method of the present invention can be illustrated by means of FIGS. 4, 5 and 6. One step is selecting a figure representing an animate object, such as the female FIG. 10. Then at least one first enhancing means should be selected to magnetically attach to the figure, based on the particular basic concept to be taught. For example, to teach concepts relating to edible objects, numbers, or the color red, first enhancing means such as dress 14 could be selected. To teach concepts relating to the color blue, counting, and geometric shapes, first enhancing means dress 18 might be selected. To teach the concept of time, first enhancing means dress 22 might be selected.

Next, a second enhancing means which relates to one feature of the selected first enhancing means should be selected and magnetically attached to the figure. Several second enhancing means are identified in FIG. 2. Ideally, the selection and placement on the figure of appropriate second enhancing means would be made by the child upon questions from the adult such as, "What color is the dress?" or, "What object do you see on the dress?", or "How many objects do you see on the dress?". Therefore, working with a selection of dress 14, the word red 32 could be the selected second enhancing means, or the word apple 36 could be selected or the number (reference number 30). As with the educational aid of the invention described above, the educational teaching method can be accomplished by choice of a variety of figures similar to those identified above, together with many first enhancing means and complimentary second enhancing means to illustrate the various basic concepts sought to be taught.

It is to be understood that modification of the above-described educational aid and teaching method is possible within the spirit of the present invention and thus the present invention should not be limited to the above-described specification but should be interpreted in accordance with the following claims.

I claim:

1. An educational aid comprising:
   (a) a figure representing an animate object;
   (b) a plurality of first enhancing means adapted to magnetically attach to the figure, wherein one surface of the first enhancing means bears a representation of at least one teaching object including a blank clock face, and
   removable hour and minute clock hands which can be magnetically attached to the blank clock face so as to represent a time; and
   (c) a plurality of second enhancing means adapted to magnetically attach to the figure, wherein the second enhancing means relates to a feature of the first enhancing means.

2. The educational aid of claim 1, wherein the second enhancing means comprises:
   (a) a plurality of numerals to represent the time shown by the hour and minute hands arranged on the clock face; and
   (b) means to separate the hour and minute numerals so as to accurately represent the time shown on the clock face.

3. An education aid comprising:
   (a) a figure representing a child;
   (b) a plurality of primary-colored adapted to magnetically attach to the figure, wherein one surface of the clothes bears a representation of at least one teaching object; and
   (c) a plurality of second enhancing means adapted to magnetically attach to the figure, wherein the second enhancing means is a word which is the name of the teaching object.

4. An education aid comprising;
   (a) figure representing a child;
   (b) a plurality of primary-colored clothes adapted to magnetically attach to the figure, wherein one surface of the clothes bears a representation of at least one teaching object; and
   (c) a plurality of second enhancing means adapted to magnetically attach to the figure, wherein the second enhancing means is a number which equals the number of teaching objects.

5. An education aid comprising:
   (a) a figure representing a child;
   (b) a plurality of primary-colored clothes adapted to magnetically attach to the figure, wherein one surface of the clothes bears a representation of at least one teaching object including a blank clock face; and
   removable hour and minute clock hands which can be magnetically attached to the blank clock face so as to represent time; and
   (c) a plurality of second enhancing means adapted to magnetically attach to the figure, wherein the second enhancing means relates to a feature of the clothes and includes
   a plurality of numerals to represent the time shown by the hour and minute hands arranged on the clock face; and means to separate the hour and minute numerals so as to accurately represent the times shown on the clock face.

6. An education aid comprising:
   (a) a figure representing a child;
   (b) a plurality of primary-colored clothes adapted to magnetically attach to the figure, wherein one surface of the clothes bears a representation of at least one teaching object wherein the teaching object is a geometric shape; and
   (c) a plurality of second enhancing means adapted to magnetically attach to the figure, wherein the second enhancing means is the same shape as the teaching object.

7. An education aid comprising:
   (a) a figure representing a child;
   (b) a plurality of primary-colored clothes adapted to magnetically attach to the figure, wherein one surface of the clothes bears a representation of at least one teaching object; and
   (c) a plurality of second enhancing means adapted to magnetically attach to the figure, wherein the second enhancing means is a word which represents the color of the first enhancing means.

8. The educational aid of claim 7, further comprising a translucent colored overlay to be placed on the first enhancing means so as to create secondary colors from the primary colors.

9. An educational teaching method, comprising the steps of:
   (a) selecting a figure representing an animate object;
   (b) selecting at least one first enhancing means to magnetically attach to the figure, wherein one surface of the first enhancing means bears a representation of at least one teaching object including a blank clock face, and
   removable hour and minute clock hands which can be magnetically attached to the blank clock face so as to represent a time; and
   (c) selecting at least one second enhancing means to magnetically attach to the figure, wherein the second enhancing means includes
   a plurality of numerals to represent the time shown by the hour and minute hands arranged on the clock face; and means to separate the hour and minute numerals so as to accurately represent the time shown on the clock face.

* * * * *